US008924527B2

(12) United States Patent
Ramankutty et al.

(10) Patent No.: US 8,924,527 B2
(45) Date of Patent: Dec. 30, 2014

(54) PROVISIONING AVAILABLE NETWORK RESOURCES (75) Inventors: Rajesh Ramankutty, Nashua, NH (US); Kuntal Chowdhury, Andover, MA (US); Andrew Gibbs, Andover, MA (US)

(73) Assignee: Cisco Technology, Inc., San Jose, CA (US)

( * ) Notice: Subject to any disclaimer, the term of this patent is extended or adjusted under 35 U.S.C. 154(b) by 825 days.

(21) Appl. No.: 12/717,730

(22) Filed: Mar. 4, 2010

(65) Prior Publication Data

US 2010/0281151 A1    Nov. 4, 2010

Related U.S. Application Data (60) Provisional application No. 61/157,472, filed on Mar. 4, 2009.

(51) Int. Cl.
G06F 15/173    (2006.01)

(52) U.S. Cl.
CPC .................... *G06F 15/173* (2013.01)
USPC ....................................... 709/223

(58) Field of Classification Search
USPC ....................................... 709/223
See application file for complete search history.

(56) References Cited

U.S. PATENT DOCUMENTS

| | | |
|---|---|---|
| 2004/0022212 A1 | 2/2004 | Chowdhury et al. |
| 2004/0116109 A1 | 6/2004 | Gibbs et al. |
| 2005/0259679 A1 | 11/2005 | Chowdhury et al. |
| 2008/0162481 A1* | 7/2008 | Sadjadi ............................. 707/8 |
| 2009/0028131 A1 | 1/2009 | Chowdhury et al. |
| 2009/0047947 A1* | 2/2009 | Giaretta et al. ............ 455/432.1 |
| 2009/0133059 A1 | 5/2009 | Gibbs et al. |
| 2009/0138302 A1 | 5/2009 | Breznik et al. |
| 2009/0156213 A1 | 6/2009 | Spinelli et al. |
| 2010/0100970 A1 | 4/2010 | Roy-Chowdhury et al. |
| 2010/0124223 A1 | 5/2010 | Gibbs et al. |
| 2010/0124933 A1 | 5/2010 | Chowdhury et al. |
| 2010/0281151 A1 | 11/2010 | Ramankutty et al. |
| 2010/0291943 A1* | 11/2010 | Mihaly et al. ................. 455/450 |
| 2010/0299419 A1 | 11/2010 | Ramankutty et al. |
| 2011/0058479 A1 | 3/2011 | Chowdhury |
| 2012/0044908 A1 | 2/2012 | Spinelli et al. |
| 2012/0166618 A1 | 6/2012 | Dahod et al. |
| 2012/0246212 A1 | 9/2012 | Ahmad et al. |
| 2012/0278853 A1 | 11/2012 | Roy-Chowdhury et al. |

FOREIGN PATENT DOCUMENTS

WO    WO 2006114628 A2 *  11/2006

* cited by examiner

*Primary Examiner* — Ryan Jakovac
(74) *Attorney, Agent, or Firm* — Wilmer Cutler Pickering Hale and Dorr LLP (57) ABSTRACT

Systems and methods are provided that allow network resources to be shared across geographical distances. This can be achieved by changing the resources available for establishing and handling call or data session processing in an area. A mobility management device can alone or in combination with a DNS server change the size or the resource pool available in some embodiments. The change in resources can be dynamic according to certain predefined conditions or can be setup beforehand to account for daily demand. This sharing of resources can allow more efficient usage of resources available across a geographic region, rather than needed to over-provision each region to account for peak demands.

24 Claims, 5 Drawing Sheets

PROVISIONING AVAILABLE NETWORK RESOURCES

CROSS-REFERENCE TO RELATED APPLICATIONS

This application claims benefit under 35 U.S.C. §119(e) of U.S. Provisional Patent Application No. 61/157,472, entitled "Provisioning Available Network Resources," filed Mar. 4, 2009, which is hereby incorporated by reference herein in its entirety.

FIELD OF THE DISCLOSURE

This disclosure relates to a system and method for providing management of available resources among network devices in a communication network.

BACKGROUND

Wireless networks are telecommunications networks that use radio waves to carry information from one node in the network to one or more receiving nodes in the network. Wired communication can also be used in portions of a wireless network, such as between cells or access points. Cellular telephony is characterized by the use of radio cells that provide radio coverage for a geographic area, with multiple cells arranged to provide contiguous radio coverage over a larger area.

The first generation of wireless telephone technology used analog mobile phones in which analog information signals were transmitted. As technology progressed a second generation (2G) of wireless service was introduced. In 2G systems, digital information signals were used to modulate a carrier. These 2G technologies used time division multiplexed access (TDMA) or code division multiple access (CDMA) technologies to distinguish multiple users. Such networks that were upgraded to handle higher-speed packet data in networks referred to as 2.5G and 3G networks. The 3rd Generation Partnership Project (3GPP) and the 3rd Generation Partnership Project 2 (3GPP2) respectively developed the GSM/UMTS/HSDPA and cdmaOne/CDMA2000 technologies. The next evolution is 4G technology, which is referred to as long term evolution-system architecture evolution (LTE-SAE) and uses orthogonal frequency division multiple access (OFDMA) technology.

Other wireless protocols have also developed including WiFi, an implementation of various IEEE 802.11 protocols, WiMAX, an implementation of IEEE 802.16, and HiperMAN, which is based on an ETSI alternative to IEEE 802.16.

Wireless communication technologies are used in connection with many applications, including, for example, satellite communications systems, portable digital assistants (PDAs), laptop computers, and mobile devices (e.g., cellular telephones, user equipment). One benefit that users of such applications can obtain is the ability to connect to a network (e.g., the Internet) as long as the user is within range of such a wireless communication technology.

SUMMARY OF THE DISCLOSURE

Systems and methods are provided that allow network resources to be shared across geographical distances. This can be achieved by changing the resources available for establishing and handling call or data session processing in an area. A mobility management device can alone or in combination with a DNS server change the size or the resource pool available in some embodiments. The change in resources can be dynamic according to certain predefined conditions or can be setup beforehand to account for daily demand. This sharing of resources can allow more efficient usage of resources available across a geographic region, rather than needed to over-provision each region to account for peak demands.

In some embodiments this is achieved by sending a request from a mobility management unit (MME) to a domain name system (DNS) server to retrieve information regarding a gateway to handle a new session, receiving a list of gateway addresses from the DNS server in response to the request that corresponds to a first plurality of gateways available to handle a new session, updating the list of gateway addresses at the MME based on network load information to correspond to a second plurality of gateways, and selecting a gateway from the list of gateway addresses at the MME to handle the new session. In other embodiments this is achieved by maintaining a list of gateway addresses at the DNS server that corresponds to a first plurality of gateways available to handle a new session originating at a MME, updating the list of gateway addresses at the DNS server based on network load information to correspond to a second plurality of gateways, receiving a request at the DNS server from the MME for a gateway to handle a new session, and providing the list of gateway addresses from the DNS server to the MME by returning at least one name authority pointer (NAPTR) record in response to the request. In some embodiments the gateways are serving gateways (SGWs), packet data serving nodes (PDSNs), access service network gateways (ASN-GWs), or serving GPRS support nodes (SGSNs).

In another embodiment, a mobility management entity (MME) for dynamically provisioning gateways in a communication network including a plurality of gateways is described. In this embodiment the MME includes a physical interface configured to send a request to a domain name system (DNS) server for a gateway to handle a new session, and to receive a list of gateway addresses from the DNS server in response to the request, wherein the list of gateway addresses corresponds to a first plurality of gateways available to handle a new session. The MME also includes a storage medium configured to store the list of gateway addresses, and a processing unit, in communication with the storage medium, that is configured to update the list of gateway addresses based on network load information to correspond to a second plurality of gateways and to select a gateway from the list of gateway addresses to handle the new session.

DETAILED DESCRIPTION

Systems and methods of providing provisioning of available network resources in communication systems are disclosed in certain embodiments. The utilization rates of network resources tend to vary throughout the day and geographically for a large network. Network operators typically over-provision the entire network to ensure that peak loading in one area of the network does not cause problems. The network resources can be managed in pools and distributed amongst network devices in the pool. Typically these pools are fixed and each pool is over-provisioned to avoid overloading conditions in the network. In some embodiments, these pools can be dynamically managed to allow resources across certain parts of the network to be shared. In order to accommodate dynamically managed resource pools, the size of the resources available at a given time can vary.

For example, during peak loading times on the East Coast, resources can be shifted across the United States to better accommodate the peak usage on the East Coast at that time. The pool of resources can be shifted to include resources from adjoining pools, which may in turn take resources from adjoining pools so that pools that are not fully utilizing resources can be shifted across one or more pools to provide resources where needed. The pools can also be dynamically shifted across a geographical area to minimize the longest distance traveled to utilize the resources made available.

Figure 1:
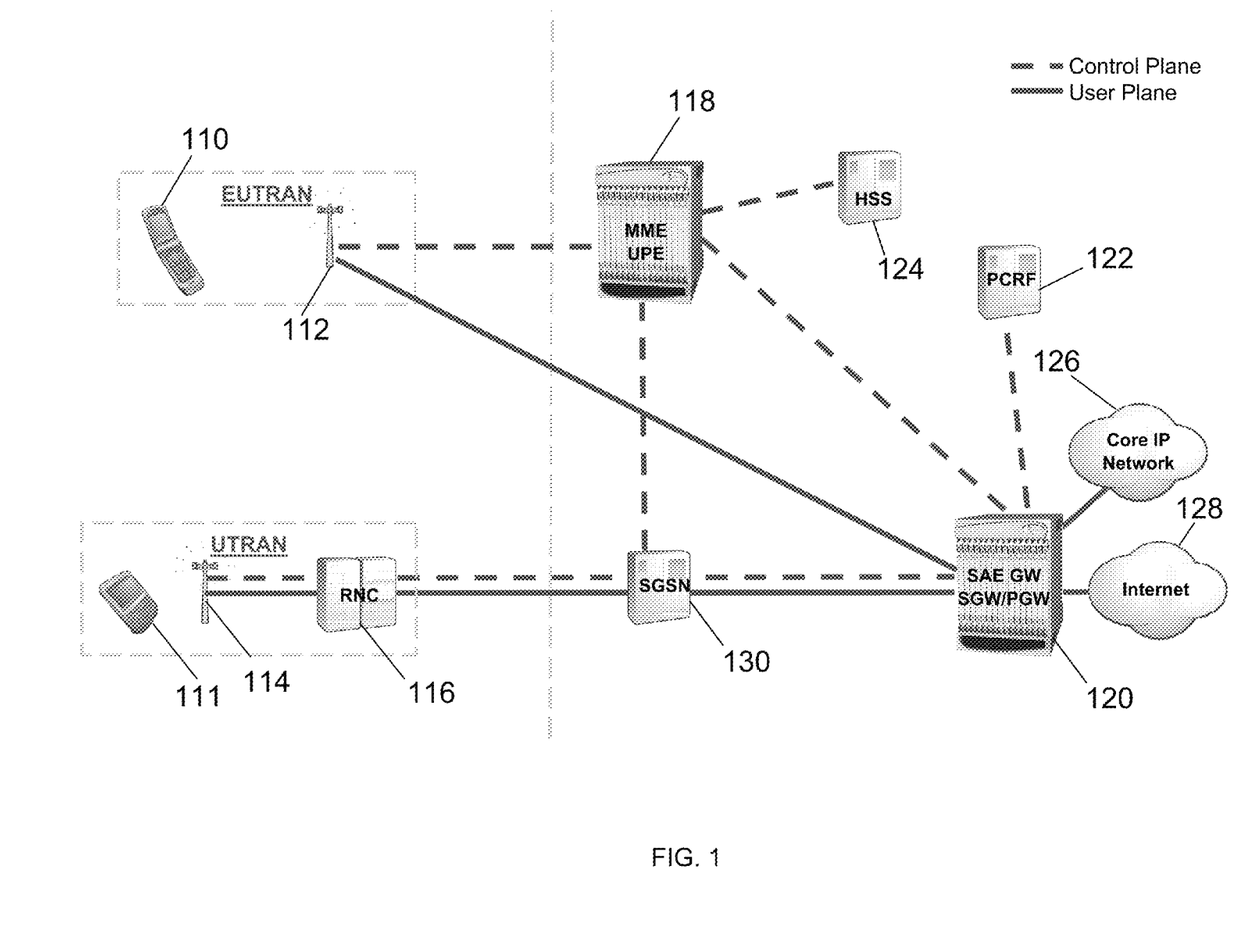
FIG. 1 illustrates a network diagram of an evolved packet core network in accordance with certain embodiments.

FIG. 1 illustrates a network diagram in accordance with certain embodiments. FIG. 1 illustrates both a universal mobile telecommunication system (UMTS) release 8 network and a LTE network. The network diagram of FIG. 1 includes user equipment (UE) 110 and 111, an evolved nodeB (eNB) 112, a nodeB 114, a radio network controller (RNC) 116, a mobility management entity (MME)/user plane entity (UPE) 118, a system architecture evolution gateway (SAE GW) 120, a policy and charging rules function (PCRF) 122, home subscriber server (HSS) 124, core IP network 126, internet 128, and Serving General packet radio service Support Node (SGSN) 130. The MME 118, SAE GW 120, and SGSN 130 can be implemented in a chassis as described below. The SAE GW 120 can include a serving gateway (SGW) as well as a packet data network gateway (P-GW). In some embodiments, the SGW and P-GW can be implemented on separate network devices. The main component of the SAE architecture is the Evolved Packet Core (EPC), also known as SAE Core. The EPC includes the MME, SGW and P-GW components.

MME 118 is a control node for the LTE access network. The MME 118 is responsible for tracking UEs and for paging procedures including retransmissions. MME 118 handles the bearer activation/deactivation process and is also responsible for choosing the SGW for a UE at the initial attach and at time of an intra-LTE handover. The MME 118 also authenticates the user by interacting with the HSS 124. The MME 118 also generates and allocates temporary identities to UEs and terminates Non-Access Stratum (NAS) signaling. The MME 118 checks the authorization of the UE to camp on the service provider's Public Land Mobile Network (PLMN) and enforces UE roaming restrictions. The MME 118 is the termination point in the network for ciphering/integrity protection for NAS signaling, and it handles the security key management. Lawful interception of signaling is also supported by the MME 118. The MME also provides the control plane function for mobility between LTE and 2G/3G access networks with an S3 interface terminating at the MME 118 from the SGSN 130. The MME 118 also terminates an S6a interface towards the home HSS for roaming UEs.

The SGW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and PDN GW). For idle state UEs, the SGW terminates the down link data path and triggers paging when down link data arrives for a UE. The SGW manages and stores UE contexts, e.g., parameters of the IP bearer service and network internal routing information. The SGW also performs replication of the user traffic in case of lawful interception. The P-GW provides connectivity to the UEs 110 and 111 to external packet data networks by being the point of exit and entry of traffic for the UE. A UE may have simultaneous connectivity with more than one P-GW for accessing multiple packet data networks. The P-GW performs policy enforcement, packet filtering for each user, charging support, lawful interception, and packet screening. The P-GW also provides an anchor for mobility between 3GPP and non-3GPP technologies such as WiMAX and 3GPP2 (CDMA 1X and EvDO).

Figure 2:
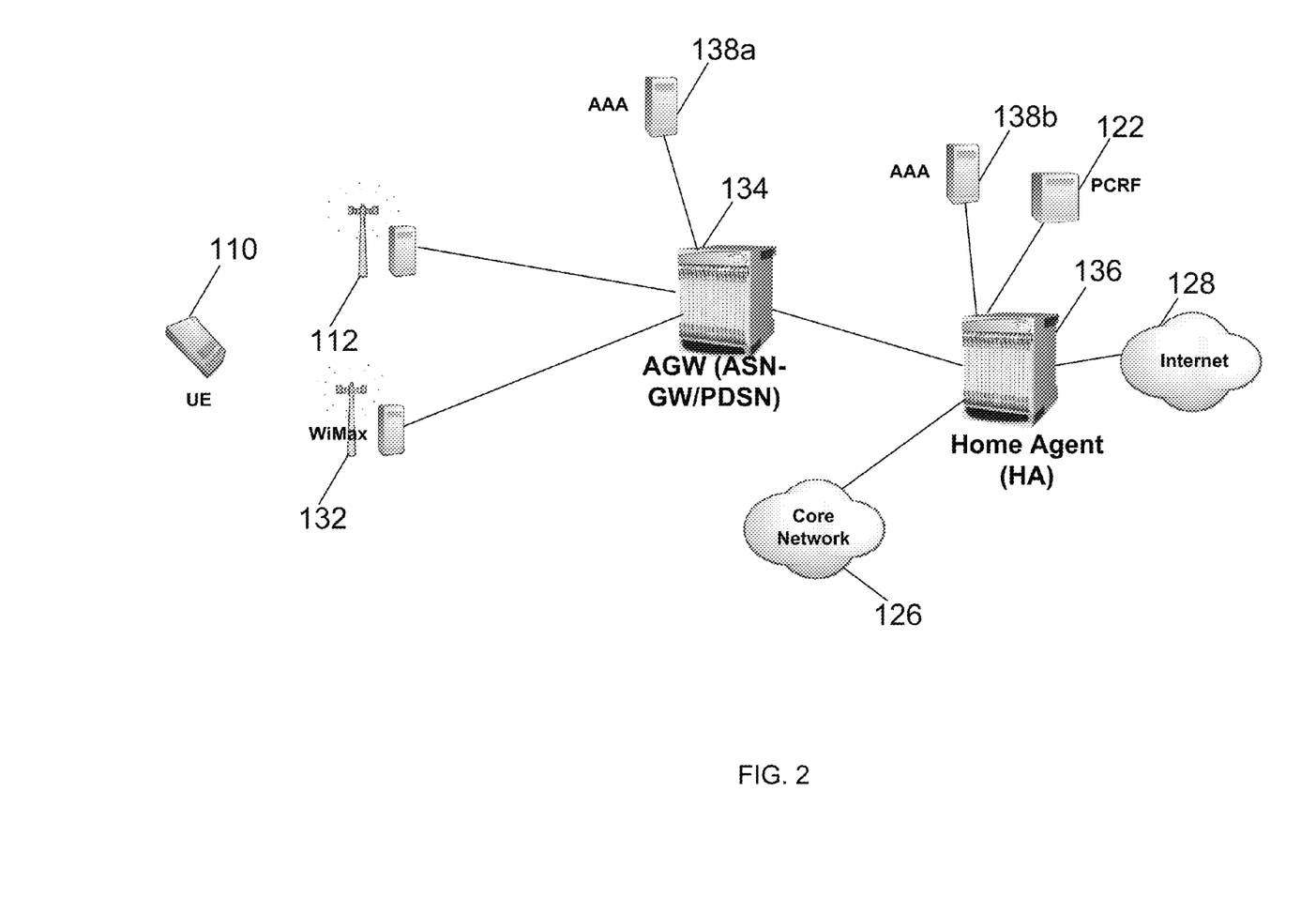
FIG. 2 illustrates a network diagram of access gateways in a network in accordance with certain embodiments.

FIG. 2 illustrates a network diagram of various access gateway configurations in accordance with certain embodiments. The network diagram of FIG. 2 includes a UE 110, a base station 112, a PCRF 122, a core network 126, an Internet 128, a WiMax access point 132, an access gateway 134, a home agent (HA) 136, and an authentication, authorization, and accounting (AAA) server 138a and 138b. The UE 110 can use a variety of radio access technologies to communicate with the base station 112. The UE can also communicate using WiMAX and use the WiMAX access point 132 to communicate with the network. The UE 110 can be a dual mode device that can communicate in at least two radio access technologies such as WiMAX and EvDO.

The access gateway 134 can be implemented in a chassis and can be an access service network gateway (ASN-GW), a packet data serving node (PDSN), or any other type of serving gateway. The access gateway 134 provides connection management and mobility across cell sites and inter-service provider network boundaries through processing of subscriber control and bearer data traffic. The access gateway 134 can also serve as the Extensible Authentication Protocol (EAP) authenticator for subscriber identity and acts as a RADIUS client to AAA server 138a. The Home Agent 136 serves a mobility anchor tracking where UE 110 is in the network and providing a fixed location to reach UE 110 and tunneling traffic to the UE 110 so the UE can maintain the same IP address wherever it is in the network.

Network operators typically see fluctuations in network usage throughout the day. The network load can increase due to time-of-day (peak hour), special-events such as concerts or rallies, natural disasters, or other anomalies. The network operators typically try to over-provision their network to handle temporary overloads by including more equipment than is needed. Even with this, it may be difficult to manage network resource deployment across a network. A solution to deal with this resource management problem can be to develop a dynamically adjustable pool of network resources. This approach can allow temporary increases/decreases in the size of the network-resources available in a given area. The pool of network resources can be access gateways such as serving gateways (SGW), packet data serving nodes (PDSN), access service network gateway (ASN-GW), a serving GPRS support node (SGSN), or any other network resource that can be provisioned in a pool.

The dynamic adjustment can occur by provisioning one (or a few) additional sets of network resources to cope with network overload (instead of over provisioning the entire network with one set each). The additional sets of network resources can be located in geographical areas between pools to reduce the link distance and any possible delays or jitter that might accompany using cross-country resources. For example, the resources could be located between the Northeast, North Midwest, Southeast, and South Midwest.

Depending on the load condition happening in a particular part of the network, the network resources can be dynamically added or deleted to mitigate the overload condition.

In one embodiment, a SGW is the resource that is desired to be managed. The SGW used in handling a session with a UE is chosen by a MME from a pool of SGWs. The pool of SGWs can be returned by DNS resolution of a tracking area identity (TAI) fully qualified domain name (FQDN). The DNS resolution returns one or more name authority pointer records (NAPTRs), which are typically used to suggest a set of network resources that can handle a particular protocol or service. Here, the NAPTR contains a set of SGWs that belong to a Tracking Area in which the eNB (base station) belongs. The size of a tracking area and the SGWs that belong to a tracking area are typically fixed, but can be set by the operator. The size of the tracking area can be dynamically changed in order to manage resources in the network. Further, criteria can be used to make sure that dynamic changes do not impair service or decrease service past a desired threshold.

In some embodiments, the DNS server can dynamically increase or decrease the size of the set of SGWs returned to an MME during SGW selection depending on load information. The load information can be either statically determined or dynamically determined. An example of static determination is when the load information is based on the time of day and prior usage patterns during the time of day to determine resources returned. Another example of static determination is when the network operator directly controls the set of SGWs to accommodate an unusual network event, such as a large sporting event or natural disaster. In a dynamic determination other measurements such as the number of sessions currently in a pool of SGWs can determine the loading conditions. A network device such as a DNS server can then use the geographical location of the various SGW and the Tracking Areas to determine the SGW returned. The geographical location can be used along with loading conditions to analyze the cost of backhauling the traffic to a given SGW with the amount of loading in a specified geographical region. By providing an economic cost and/or latency cost to the network topology the network device can distinguish among the available resources and can choose the nearest resource which would provide a certain level of service.

The same logic can be implemented in a MME if the MME knows the network topology or the economic cost or latency cost of the various paths between a base station (e.g., an eNB) and a SGW. In some embodiments, DNS servers may not be able to obtain load information, so an alternative approach can be to let a mobility management device such as a MME, Home Agent, or GGSN receive loading conditions from the access gateways. For example, with an MME the SGWs can report their load conditions in S11 messages to the MME. The load condition information can be piggybacked in an existing S11 message, or be provided in a standalone message for load information carriage or other administration information carriage. The MME can track and store the reported load information from each of the in-use SGWs and the MME can use a load-balancing algorithm to distribute load among the SGWs. The MME can also programmed to increase or decrease the size of in-use SGWs to serve a geographical area at a given load condition. This change in the resource pool and which SGWs are selected in the resource pool can be based on distance and load information. In this embodiment, the DNS servers can be configured to return the complete list of SGWs that can be used by the MME (or MME pool).

Figure 3:
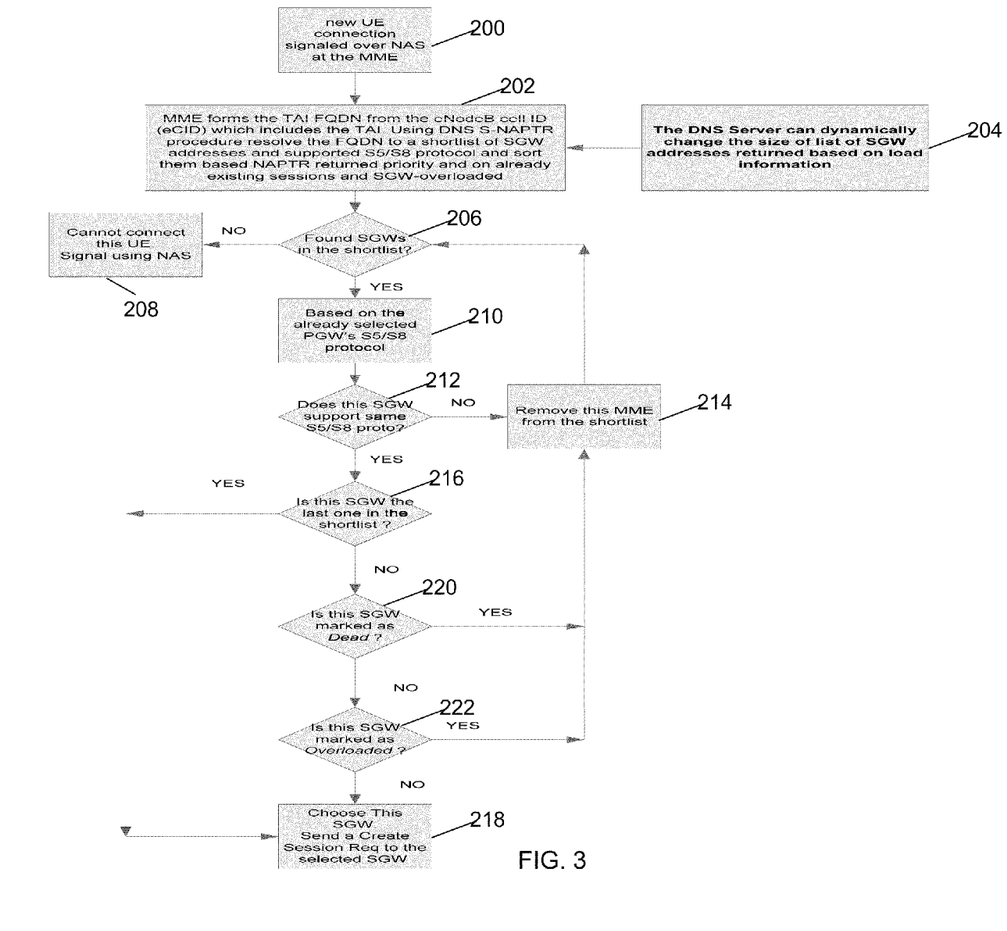
FIG. 3 illustrates a selection logic in accordance with certain embodiments.

FIG. 3 illustrates a selection logic for picking a gateway in accordance in some embodiments. The selection logic of FIG. 3 uses the DNS to change the size of the list and uses an MME to select a SGW for handling a UE. The selection logic can be stored in a computer readable medium that is accessible by a processor on a chassis implementing the MME. In 200, a new UE connection is signaled over the non access stratum (NAS) protocol to the MME. In 202, the MME forms a request for obtaining resources from the DNS server. The request can be a tracking area identity fully qualified domain name (TAI FQDN) formed from the eNodeB cell ID (eCID) including the tracking area identity. In 204, the DNS server sends a list of SGW addresses which can be resolved to a shortlist by the MME in 202. In some embodiments, the DNS can dynamically change the size of list of SGW addresses returned based on load information. In other embodiments, the MME resolves the shortlist from a full list and determines the size of the shortlist based on other conditions, such as load information. This information can be obtained by periodically polling the network devices to get load information from them. Other methods are also available such as inserting this information into messaging between the network device and the MME.

In 206, the MME finds SGWs in the shortlist created in 202. If no SGWs are found in the shortlist in 206, this UE cannot connect using NAS and the MME signals the UE that a session cannot be established in 208. If a SGW can be found in 206, a PGW is selected in 210 based on the S5/S8 protocol. In 212, the MME checks whether the SGW supports the same S5/S8 protocol as the PGW. If not in 214, the SGW is removed from the MME shortlist and the process starts over with a modified shortlist in 206. If the SGW does support the same protocol in 212, then the MME checks if the SGW is the last one in the shortlist in 216. If the SGW is the last one in the shortlist in 216, this SGW is chosen in 218 and a create session request is sent to the selected SGW. If the SGW is not the last one in the shortlist 216, then the MME checks whether the SGW is marked as dead in 220 or overloaded in 222. If the SGW is marked as dead in 220 or overloaded in 222, this entry can be checked for when the SGW was marked and the number of times the SGW has been selected from the shortlist. If the time meets a threshold or a threshold number of tries have been passed up, this SGW is chosen and the new result is recorded at the MME. If the attempt is unsuccessful, then the entry is maintained as being dead or overloaded. If the threshold is not met in 222 and the SGW is marked as overloaded or dead, then this is removed from the shortlist in 214. The PGW can go through the same overloaded check in the selection logic to determine the PGW selected.

Figure 4:
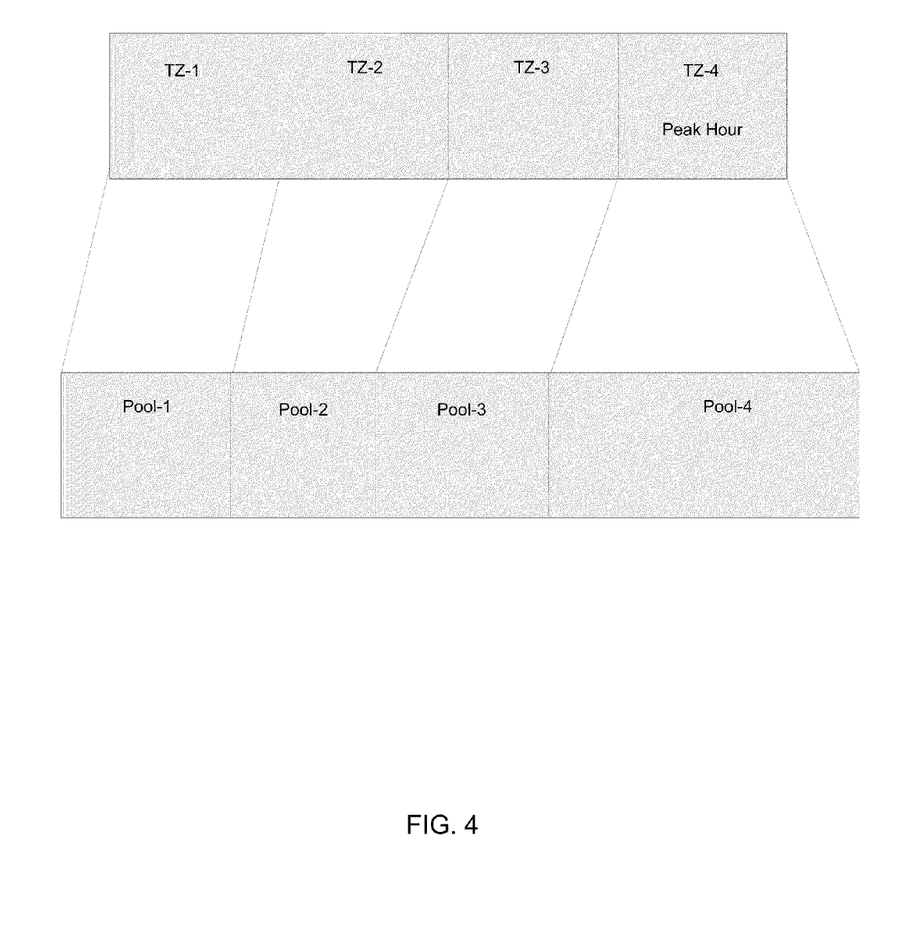
FIG. 4 illustrates time based resource shifting in accordance with certain embodiments.

FIG. 4 illustrates time based resource pooling in accordance with certain embodiments. As discussed above, the pool size of resources available can be changed throughout the day to provide sharing of resources. This can be provided by having a set of shared resources that are provisioned where needed across a geographical area. As illustrated in FIG. 4, a large geographical area can span time zones allowing resources to be shared across two or more time zones. This can allow offsets in peak hour demands such that the peak hour of TZ-4 is offset by three hours from the peak hour of TZ-1. This can allow shifting of resources from a region where demand is higher to a region where demand is less because of the offset in time. The pool of resources can be a shared common pool established at certain locations or can be the shifting of existing resources among regions. For example, the tracking area of TZ-4 can include additional resources from TZ-3, the TZ-3 can shift to include resources from TZ-2 to make up for some of the resources shifted to TZ-4, and the same can occur for TZ-2 and TZ-1, with TZ-1's resources being used where demand is greatest.

The chassis described above can implement multiple and different integrated functionalities. In some embodiments, a mobility management entity (MME), a serving gateway (SGW), a PDN gateway (P-GW), an access gateway, a packet data serving node (PDSN), a foreign agent (FA), or home agent (HA) can be implemented on a chassis. Other types of functionalities can also be implemented on a chassis in other embodiments are a Gateway General packet radio service Serving Node (GGSN), a serving GPRS support node (SGSN), a packet data inter-working function (PDIF), an access service network gateway (ASNGW), a base station, a access network, a User Plane Entity (UPE), an IP Gateway, an access gateway, a session initiation protocol (SIP) server, a proxy-call session control function (P-CSCF), and an inter-rogating-call session control function (I-CSCF), a serving gateway (SGW), and a packet data network gateway (PDN GW). In certain embodiments, one or more of the above-mentioned other types of functionalities are integrated together or provided by the same functionality. For example, an access network can be integrated with a PDSN. A chassis can include a PDSN, a FA, a HA, a GGSN, a PDIF, an ASNGW, a UPE, an IP Gateway, an access gateway, or any other applicable access interface device. In certain embodiments, a chassis is provided by Starent Networks, Corp. of Tewksbury, Mass. in a ST16 or a ST40 multimedia platform.

Figure 5:
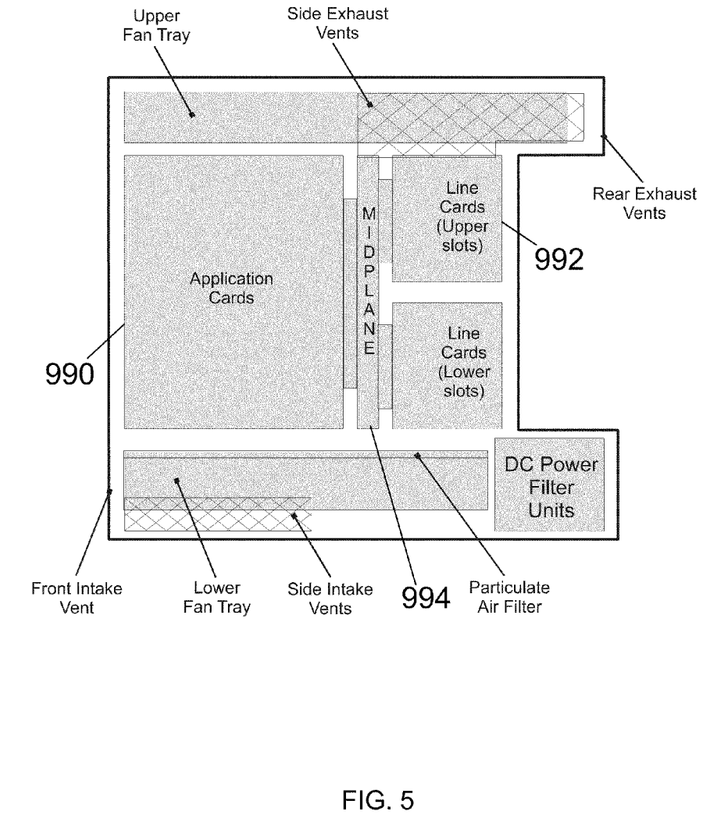
FIG. 5 illustrates a chassis in accordance with certain embodiments.

The features of a chassis that implements a gateway, in accordance with some embodiments, are further described below. FIG. 5 illustrates positioning of cards in the chassis in accordance with some embodiments. The chassis includes slots for loading application cards 990 and line cards 992. A midplane 994 can be used in the chassis to provide intra-chassis communications, power connections, and transport paths between the various installed cards. The midplane 994 can include buses such as a switch fabric, a control bus, a system management bus, a redundancy bus, and a time division multiplex (TDM) bus. The switch fabric is an IP-based transport path for user data throughout the chassis implemented by establishing inter-card communications between application cards and line cards. The control bus interconnects the control and management processors within the chassis. The chassis management bus provides management of system functions such as supplying power, monitoring temperatures, board status, data path errors, card resets, and other failover features. The redundancy bus provides transportation of user data and redundancy links in the event of hardware failures. The TDM bus provides support for voice services on the system.

The chassis supports at least four types of application cards: a switch processor card, a system management card, a packet service card, and a packet accelerator card. The switch processor card serves as a controller of the chassis and is responsible for such things as initializing the chassis and loading software configurations onto other cards in the chassis. The packet accelerator card provides packet processing and forwarding capabilities. Each packet accelerator card is capable of supporting multiple contexts. Hardware engines can be deployed with the card to support parallel distributed processing for compression, classification traffic scheduling, forwarding, packet filtering, and statistics compilations. The system management card is a system control and management card for managing and controlling other cards in the gateway device. The packet services card is a high-speed processing card that provides multi-threaded point-to-point, packet data processing, and context processing capabilities, among other things.

The packet accelerator card performs packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing. The line cards when loaded in the chassis provide input/output connectivity and can also provide redundancy connections as well.

The operating system software can be based on a Linux software kernel and run specific applications in the chassis such as monitoring tasks and providing protocol stacks. The software allows chassis resources to be allocated separately for control and data paths. For example, certain packet accelerator cards can be dedicated to performing routing or security control functions, while other packet accelerator cards are dedicated to processing user session traffic. As network requirements change, hardware resources can be dynamically deployed to meet the requirements in some embodiments. The system can be virtualized to support multiple logical instances of services, such as technology functions (e.g., a PDN GW, SGW, PDSN, ASNGW, PDIF, HA, GGSN, or IPSG).

The chassis' software can be divided into a series of tasks that perform specific functions. These tasks communicate with each other as needed to share control and data information throughout the chassis. A task is a software process that performs a specific function related to system control or session processing. Three types of tasks operate within the chassis in some embodiments: critical tasks, controller tasks, and manager tasks. The critical tasks control functions that relate to the chassis' ability to process calls such as chassis initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a chassis include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the chassis by monitoring the various software and hardware components of the chassis. Recovery control task subsystem is responsible for executing a recovery action for failures that occur in the chassis and receives recovery actions from the high availability task subsystem. Shared configuration task subsystem provides the chassis with an ability to set, retrieve, and receive notification of chassis configuration parameter changes and is responsible for storing configuration data for the applications running within the chassis. Resource management subsystem is responsible for assigning resources (e.g., processor and memory capabilities) to tasks and for monitoring the task's use of the resources.

Virtual private network (VPN) subsystem manages the administrative and operational aspects of VPN-related entities in the chassis, which include creating separate VPN contexts, starting IP services within a VPN context, managing IP pools and subscriber IP addresses, and distributing the IP flow information within a VPN context. In some embodiments, within the chassis, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards. The session subsystem is responsible for processing and monitoring a mobile subscriber's data flows in some embodiments. Session processing tasks for mobile data communications include: A10/A11 termination for CDMA networks, GSM tunneling protocol termination for GPRS and/or UMTS networks, asynchronous PPP processing, packet filtering, packet scheduling, Difserv codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In some embodiments, the software needed for implementing a process or a database includes a high level procedural or an object-orientated language such as C, C++, C#, Java, or Perl. The software may also be implemented in assembly language if desired. Packet processing implemented in a chassis can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document.

Although the present invention has been described and illustrated in the foregoing exemplary embodiments, it is understood that the present disclosure has been made only by way of example, and that numerous changes in the details of implementation of the invention may be made without departing from the spirit and scope of the invention, which is limited only by the claims which follow.

What is claimed is:

1. A method comprising:
sending a request from a mobility management entity (MME) to a domain name system (DNS) server to retrieve information regarding a gateway to handle a new session;
receiving, at the MME, a list of gateway addresses from the DNS server in response to the request that corresponds to a complete set of gateways available to handle a new session;
identifying, at the MME, a first set of gateways out of the complete set of gateways which are geographically located within a dynamically-resizable tracking area (TA);
resizing, at the MME, the dynamically-resizable TA based on evaluating network load information for each of the gateways in the first set of gateways;
identifying, at the MME, a second set of gateways out of the complete set of gateways which are geographically located within the newly resized dynamically-resizable TA, wherein the second set of gateways is different from the first set of gateways; and
selecting, at the MME, a gateway from the second set of gateways to handle the new session.

2. The method of claim 1, wherein the second set of gateways is a subset of the first set of gateways.

3. The method of claim 1, further comprising the MME using a cost function that incorporates topology of a network to determine increased latency and monetary cost of backhauling traffic to the selected gateway.

4. The method of claim 1, wherein the gateways are gateways of at least one of the types comprising: serving gateways (SGWs), packet data serving nodes (PDSNs), access service network gateways (ASN-GWs), and serving GPRS support nodes (SGSNs).

5. The method of claim 1, wherein the network load information is sent to the MME by a network operator.

6. The method of claim 1, wherein the network load information includes a time zone in a geographic area associated with the gateways.

7. The method of claim 1, wherein the network load information is received at the MME via messages sent from the gateways.

8. The method of claim 1, wherein the MME uses a load-balancing algorithm to select the gateway from the second set of gateways.

9. A method comprising:
sending a request from a control node to a name server to retrieve information regarding a gateway to handle a new session;
receiving, at the control node, a list of gateway addresses from the name server in response to the request that corresponds to a complete set of gateways available to handle a new session;
identifying, at the control node, a first set of gateways out of the complete set of gateways which are geographically located within a dynamically-resizable tracking area (TA);
resizing, at the control node, the dynamically-resizable TA based on evaluating network load information for each of the gateways in the first set of gateways;
identifying, at the control node, a second set of gateways out of the complete set of gateways which are geographically located within the newly resized dynamically-resizable TA, wherein the second set of gateways is different from the first set of gateways; and
selecting, at the control node, a gateway from the second set of gateways to handle the new session.

10. The method of claim 9, wherein the second set of gateways is a subset of the first set of gateways.

11. The method of claim 9, further comprising the control node using a cost function that incorporates topology of a network to determine increased latency and monetary cost of backhauling traffic to the selected gateway.

12. The method of claim 9, wherein the network load information is sent dynamically to the control node by a network operator.

13. The method of claim 9, wherein the network load information is received at the control node via messages sent from the gateways.

14. The method of claim 9, wherein the network load information includes a time zone in a geographic area associated with the gateways.

15. The method of claim 9, wherein the control node is a mobility management entity (MME) implemented on a chassis, and the name server is a domain name system (DNS) server.

16. The method of claim 9, wherein the gateways are gateways of at least one of the types comprising: serving gateways (SGWs), packet data serving nodes (PDSNs), access service network gateways (ASN-GWs), and serving GPRS support nodes (SGSNs).

17. An apparatus comprising:
 a physical interface configured to send a request to a domain name system (DNS) server for a gateway to handle a new session, and to receive a list of gateway addresses from the DNS server in response to the request that corresponds to a complete set of gateways available to handle a new session;
 a storage medium configured to store the complete list of gateway addresses; and
 a processing unit, in communication with the storage medium, for processing such that the apparatus is configured to:
  identify a first set of gateways out of the complete set of gateways which are geographically located within a dynamically-resizable tracking area (TA);
  resize the dynamically-resizable TA based on evaluating network load information for each of the gateways in the first set of gateways;
  identify a second set of gateways out of the complete set of gateways which are geographically located within the newly resized dynamically-resizable TA, wherein the second set of gateways is different from the first set of gateways; and
  select a gateway from the second set of gateways to handle the new session.

18. The apparatus of claim 17, wherein the second set of gateways is a subset of the first set of gateways.

19. The apparatus of claim 17, wherein the processing unit is configured to use a cost function that incorporates topology of a network to determine increased latency and monetary cost of backhauling traffic to the selected gateway.

20. The apparatus of claim 17, wherein the gateways are gateways of at least one of the types comprising: serving gateways (SGWs), packet data serving nodes (PDSNs), access service network gateways (ASN-GWs), and serving GPRS support nodes (SGSNs).

21. The apparatus of claim 17, wherein the processing unit is configured to incorporate network load information sent by a network operator.

22. The apparatus of claim 17, wherein the processing unit is configured to incorporate network load information that includes a time zone in a geographic area associated with the gateways.

23. The apparatus of claim 17, wherein the processing unit is configured to incorporate the network load information received via messages sent from the first set of gateways.

24. The apparatus of claim 17, wherein the processing unit uses a load-balancing algorithm to select the gateway from the second set of gateways.

* * * * *